United States Patent
Haimer

(10) Patent No.: US 9,878,375 B2
(45) Date of Patent: Jan. 30, 2018

(54) TOOL HOLDER HAVING SLITS

(71) Applicant: FRANZ HAIMER MASCHINENBAU KG, Hollenbach-Igenhausen (DE)

(72) Inventor: Franz Haimer, Igenhausen (DE)

(73) Assignee: FRANZ HAIMER MASCHINENBAU KG, Hollenbach-Igenhausen (DE)

( * ) Notice: Subject to any disclaimer, the term of this patent is extended or adjusted under 35 U.S.C. 154(b) by 114 days.

(21) Appl. No.: 14/782,361

(22) PCT Filed: Mar. 31, 2014

(86) PCT No.: PCT/EP2014/056481
§ 371 (c)(1),
(2) Date: Oct. 5, 2015

(87) PCT Pub. No.: WO2014/161825
PCT Pub. Date: Oct. 9, 2014

(65) Prior Publication Data
US 2016/0052061 A1    Feb. 25, 2016

(30) Foreign Application Priority Data

Apr. 5, 2013 (DE) .................. 10 2013 103 427

(51) Int. Cl.
*B23Q 11/10* (2006.01)
*B23B 31/117* (2006.01)

(52) U.S. Cl.
CPC ...... *B23B 31/1179* (2013.01); *B23Q 11/1023* (2013.01); *B23B 2231/24* (2013.01);
(Continued)

(58) Field of Classification Search
CPC ............... B23B 31/117; B23B 31/1179; B23B 2231/24; B23Q 11/1015; B23Q 11/1023;
(Continued)

(56) References Cited

U.S. PATENT DOCUMENTS 4,721,423 A    1/1988   Kubo
6,315,506 B1   11/2001   Mizoguchi
(Continued)

FOREIGN PATENT DOCUMENTS

DE           10065383 A1    7/2002
DE   10 2005 013 483 A1    9/2006
(Continued)

OTHER PUBLICATIONS

English translation of International Preliminary Report on Patentability dated Oct. 6, 2015 for PCT/EP2014/056481.
(Continued)

*Primary Examiner* — Eric A Gates
*Assistant Examiner* — Chwen-Wei Su
(74) *Attorney, Agent, or Firm* — Paul D. Bianco; Katharine Davis; Fleit Gibbons Gutman Bongini & Bianco PL

(57) ABSTRACT

A tool holder for non-positively holding a rotatable tool by a receiving body containing a receiving opening with slits extending radially from the inner wall towards the exterior and running in the longitudinal direction of the receiving body. To permit a simple production process, the receiving body has an insert fixed into a receiving section.

10 Claims, 3 Drawing Sheets

(52) U.S. Cl.
CPC .............. *Y10T 279/17111* (2015.01); *Y10T 279/17965* (2015.01)

(58) Field of Classification Search
CPC ..... Y10T 279/17957; Y10T 279/17965; Y10T 279/17111
See application file for complete search history.

(56) References Cited

U.S. PATENT DOCUMENTS

| | | | |
|---|---|---|---|
| 6,443,462 B2 | 9/2002 | Tempest | |
| 7,182,558 B2 | 2/2007 | Haimer | |
| 7,217,072 B1 | 5/2007 | Haimer | |
| 8,668,413 B2 * | 3/2014 | Volokh | B23B 31/113 279/93 |
| 9,566,650 B2 * | 2/2017 | Teusch | B23B 31/1178 |
| 2002/0094250 A1 | 7/2002 | Voss | |
| 2004/0052598 A1 | 3/2004 | Haimer | |
| 2008/0185793 A1 | 8/2008 | Haimer et al. | |
| 2011/0156363 A1 * | 6/2011 | Haimer | B23B 31/02 279/20 |

FOREIGN PATENT DOCUMENTS

| | | | |
|---|---|---|---|
| DE | 10 2007 041937 A1 | 3/2009 | |
| DE | 102007041937 A1 | 3/2009 | |
| JP | 2003334738 A * | 11/2003 | |
| JP | 2004050337 A * | 2/2004 | ........... B23Q 1/0018 |
| JP | 2005335015 A * | 12/2005 | |
| WO | WO 2007042020 A2 * | 4/2007 | ........... B23B 31/028 |

OTHER PUBLICATIONS

International Search Report dated Jul. 15, 2014 for PCT/EP2014/056481 filed Mar. 31, 2014.
Result of Search Report for German Application No. 10 2013 103 427.6 filed Apr. 5, 2013 for for PCT/EP2014/056481 filed Mar. 31, 2014.
International Preliminary Report on Patentability dated Oct. 6, 2015 for PCT/EP2014/056481.
English translation of Written Opinion dated Oct. 5, 2015 for PCT/EP2014/056481.

* cited by examiner

TOOL HOLDER HAVING SLITS

FIELD OF THE INVENTION

The invention concerns a tool holder for non-positively holding a rotatable tool, in particular, drilling and milling tools and reamers.

BACKGROUND OF THE INVENTION

Such a tool holder is known from DE 100 65 383 A1. There, several slits or recesses which reduce the radial heat conduction cross-section are provided in a circumference part of a front clamping area, which lies radially on the inside. By means of such slits, the expansion of the front clamping area achieved by heating is improved and less material must be heated in the clamping area of the receiving body, in order to achieve the widening needed for the insertion of the tools. Since the material essential for the widening lies on the outside, a lower introduction of heat or a more rapid widening is also possible with the heat acting from the outside. In this way, the tool holders can also have smaller dimensions. However, the production of such slits is relatively expensive, particularly for small tool holders, since the slits cannot be formed continuously as a result of the usually present threaded connections for cooling agent transfer tubes or other connecting parts of an interior cooling agent supply.

SUMMARY OF THE INVENTION

A tool holder is disclosed, and in some embodiments the tool holder can be manufactured using a simple production process.

Expedient refinements and advantageous developments of the invention are also disclosed.

In the tool holder in accordance with the invention, a separate insert is fixed in a receiving section of the receiving body. In this way, first of all, the slits can be made along the entire length of the clamping area, for example, by wire eroding or other suitable processes, without having to take into consideration threads or other connecting parts. After producing the slits, the insert in the receiving body can be installed, so that there is no impairment and limitation for the position and the course of the slits.

Preferably, the insert can have a connection for a connecting part to supply an internal cooling agent or lubricant. This simplifies the possibility of also connecting partially standardized cooling agent or lubricant supply links. However, it is also possible to provide a connection for a compressed air conduit or the like.

Other function elements which also need not be standardized are also possible in the interior of the insert, however. For example, the insert can contain a simple borehole, or it may also not have a borehole, so that it forms a tight seal.

The radius of the receiving section for the insert is preferably made larger than the largest radius of the slits. In this way, the slits can be simply produced continuously from the front side of the receiving body, through the clamping area, to the receiving section, without colliding with threads or any other connections.

The slits can run parallel, or at an incline to the rotational axis of the receiving body. By means of an inclined arrangement, the cooling agent can be supplied, via the slits, to the shaft or the tip of the tool.

The insert can be fixed in the receiving body with a thread. In this respect, the insert can expediently have an outer thread to engage with an internal thread in the receiving holder. The insert, however, can also be placed firmly in the receiving body by cementing, soldering, pressing, or in some other suitable way.

In order to facilitate the installation of the insert, the insert can have a special interior contour with indentations for engagement with an installing tool.

For the sealed fixing of the insert in the receiving body, at least one sealing lip can be arranged on the insert. The sealing lip can be formed, in a simple and advantageous implementation, by an annular groove on a front side of the insert.

The holder opening can have different profiles. For example, it can have an essentially uniform diameter or it can be made as a stepped receiving opening in order to form a distribution space for the supplied cooling-lubricating agent.

BRIEF DESCRIPTION OF THE DRAWINGS

Other features and advantages of the invention can be deduced from the following description of a preferred embodiment with the aid of the drawing. The figures show the following.

DETAILED DESCRIPTION OF THE INVENTION

Figure 1:
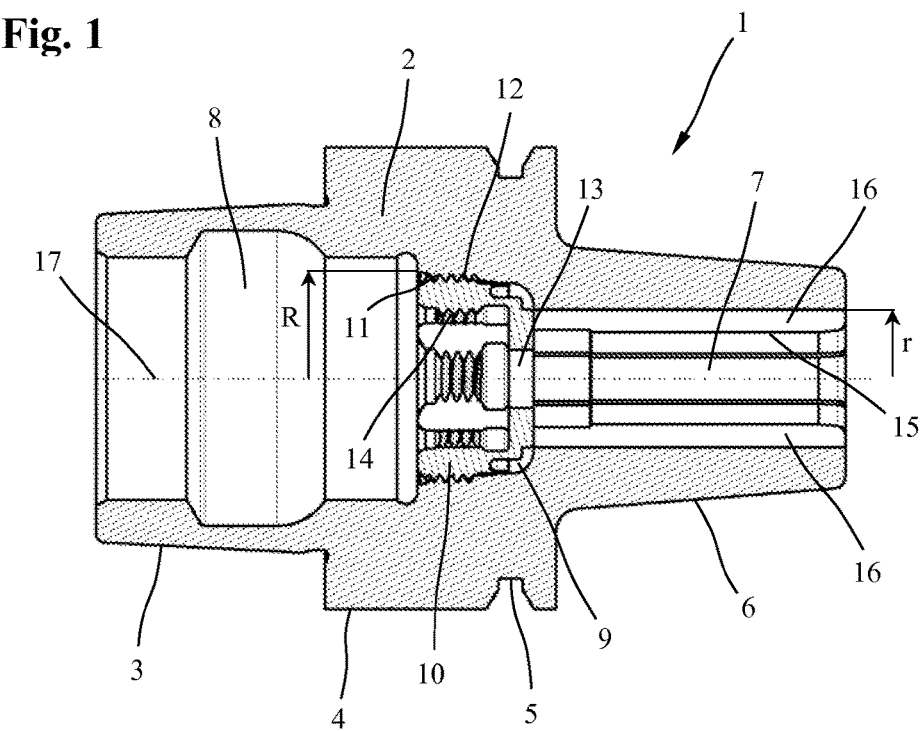
FIG. 1, a first embodiment example of a tool holder in a longitudinal section.

FIG. 1 shows a tool holder 1, provided here with an HSK (hollow taper shank) interface, for non-positively holding drilling and milling tools and reamers or other rotatable tools. The tool holder 1 is designed as a shrink chuck in the shown embodiment and contains a rotation-symmetrical receiving body 2, which has a conical rear part 3 to hold, in a work spindle of a tool machine, a middle cylindrical part 4 with a gripper groove 5 and a front clamping area 6 with a receiving opening 7 for a tool shaft. In the depicted tool holder 1, the front clamping area 6 can be heated, for example, by means of inductive heating, wherein the inside diameter of the receiving opening 7 is increased. When heated, the shaft of the tool to be clamped is introduced into the receiving opening 7, the ratio of the inside diameter of the receiving opening 7 to the outer diameter of the tool shaft being designed in such a way that the tool is firmly held in the tool holder 1 when the clamping area 6 has subsequently cooled down.

Between a rear hollow space 8 in a rear conical part 3 and the receiving opening 7 in the front clamping area 6, the receiving body 2 has a holder 9, which, in comparison to the receiving opening 7, is radially enlarged for an insert 10, in order to fix a cooling agent tube or another suitable supply link for a cooling agent. The receiving section 9, which has a cylindrical design here, has an internal thread 11 for a corresponding outer thread 12 on the insert 10. Via the internal thread 11 and the outer thread 12, the insert 10 can be screwed in from the back side of the receiving body 2, through the hollow space 8, into the receiving section 9 of the receiving body 2. The insert 10, provided with a passage opening 13, also has a connection 14, to which a coolant tube or another suitable coolant supply link can be connected. In the depicted embodiment, the connection 14 is designed in the shape of a connecting thread, formed as an internal thread.

In the front clamping area 6 of the receiving body 2, there are several slits 16, running in the longitudinal direction of the receiving body 2 and extending, radially, towards the exterior, from an inner wall 15 of the receiving opening 7. Due to the slits 16, less material has to be heated, in order to achieve the widening needed for the insertion of the tools. Since the material essential for the widening lies on the exterior, a lower heat introduction or a quicker widening is also possible by the external heating. Particularly for small tool holders with a smaller volume in the clamping area that it is thus possible to also attain the necessary widening with less heating. During machining, moreover, cooling-lubricating agent can be conducted, via these slits 16, through the tool holder, to the tool.

The slits 16, which are open towards the interior, run through the entire length of the front clamping area 6 from the front end of the receiving body 2 to the receiving section 9 for the insert 10. The outer radius r of the slits 16 is smaller than the radius R of the receiving section 9 for the insert 10, which is circular in its cross-section, so that the slits 16 can be simply produced, for example, by wire eroding or other suitable processes, without having to take into consideration threads or other connecting parts. Only after the production of the slits 16 is the insert 10 with the connection 14 formed as an internal thread screwed into the receiving section 9. In the depicted embodiment, the slits 16 run parallel to the rotational axis 17 of the receiving body 2. However, the slits 16 can also have, for example, a course which is inclined inwards in the direction of the front end, so that the cooling-lubricating agent can be conducted to the shaft or to the tip of the tool.

Figure 2:
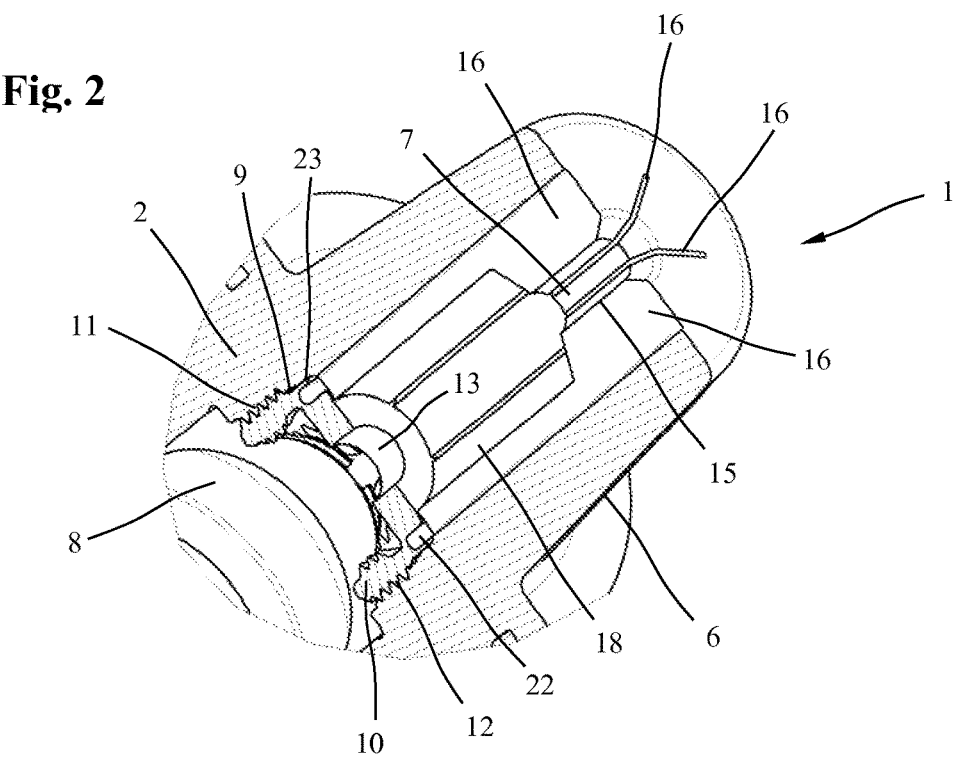
FIG. 2, a second embodiment example of a tool holder in a partially cut perspective.

In accordance with FIG. 1, the receiving opening 7 in the front clamping area 6 can be made with an essentially uniform inside diameter or, for tools with a smaller shaft diameter, as a stepped borehole with a smaller front inside diameter and a larger rear inside diameter, as is shown in FIG. 2. By virtue of the rear area of the receiving opening 7 with the increased inside diameter, a distribution space 18 can be created for the cooling-lubricating agent supplied via the insert 10.

Figure 3:
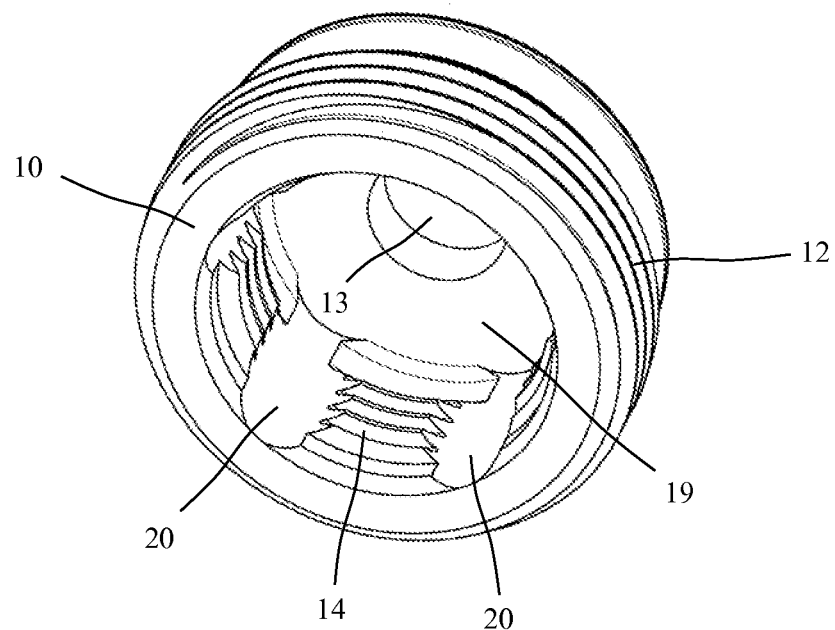
FIG. 3, an insert of the tool holder of FIG. 1 in perspective.
Figure 4:
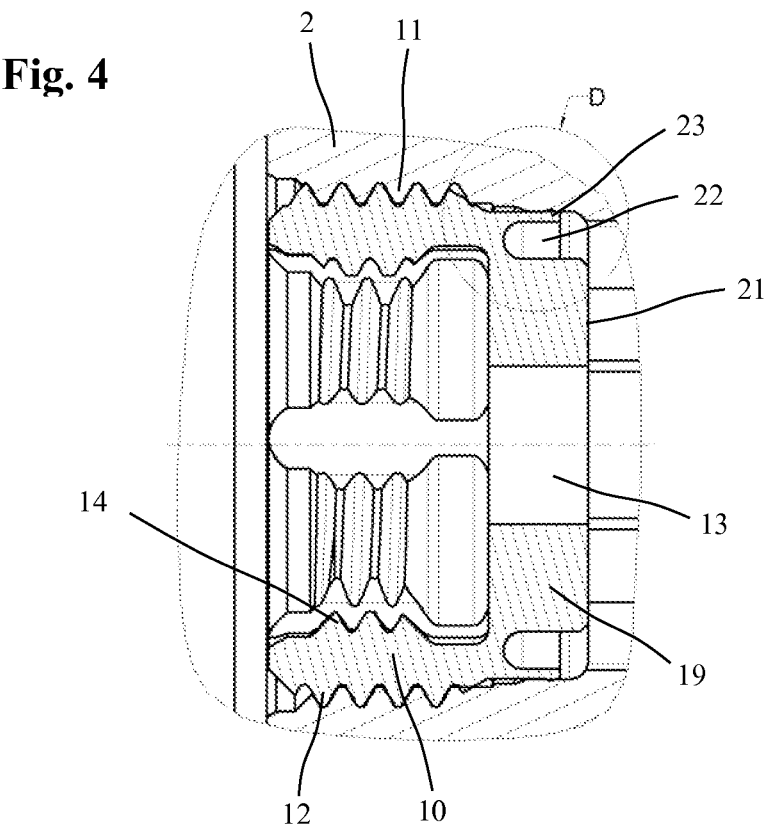
FIG. 4, the insert of FIG. 3 in a longitudinal section.
Figure 5:
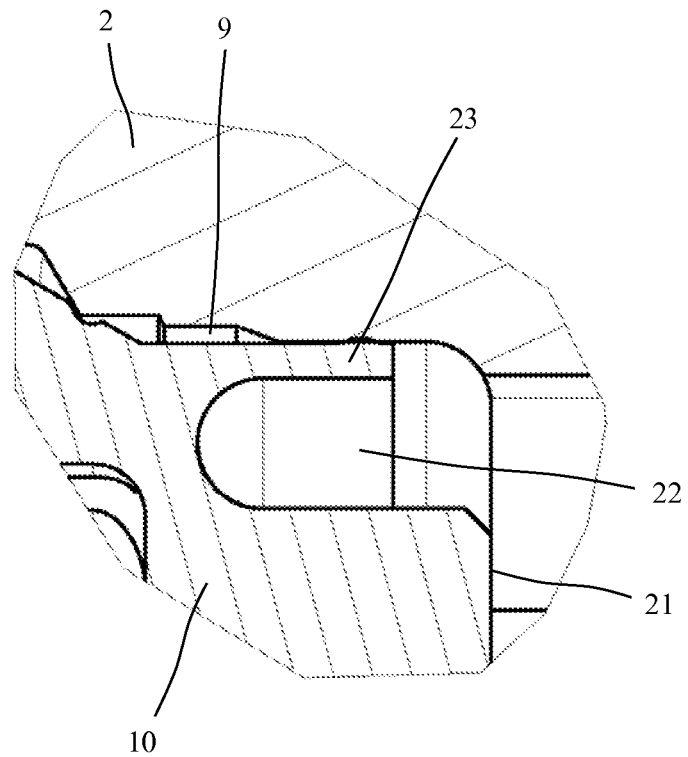
FIG. 5, an enlarged detail view of area D of FIG. 4.

As can be seen, especially from FIGS. 3 to 5, the socket-shaped insert 10 has an inner front wall 19, through which the passage opening 13 runs. In addition to the outer thread 12 and the connection 14, made as an internal thread, the insert 10 also has a special inner contour with several indentations 20, distributed over the circumference, to engage with an installing tool. By means of the installing tool, which engages with the indentations 20, the insert 10 can be screwed in the receiving body 2. The connection 14 of the insert 10, which is designed as an internal thread, is used to screw in a cooling agent transfer tube, through which a cooling-lubricating agent, introduced by a work spindle of a tool machine, can be conducted, via the slits 16, to the tool.

In FIGS. 4 and 5, one can see that an annular groove 22 with an outer sealing web 23 is located on the front side 21 of the insert 10, which points to the front clamping area 6. The sealing web 23 is flexible in the radial direction and thus can ensure a radial sealing of the insert 10 relative to the receiving body 2. A sealing can also be attained via separate sealing rings or other sealing elements.

Figure 6:
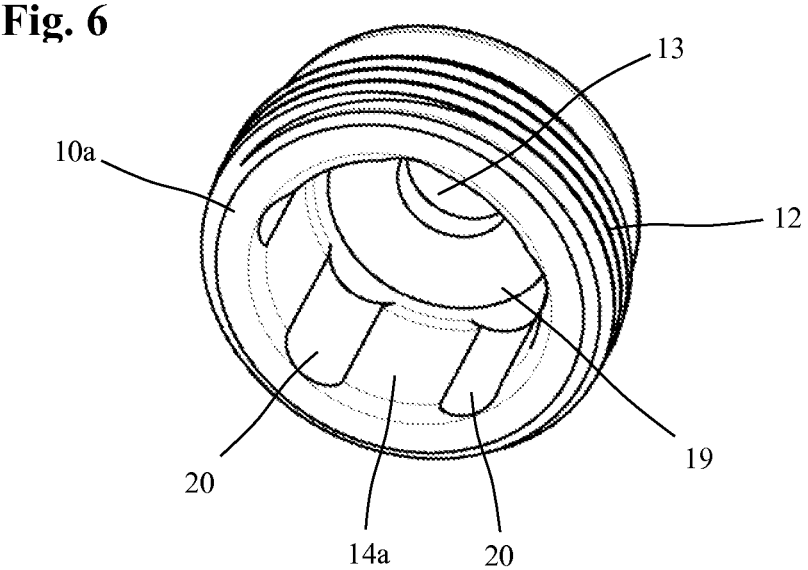
FIG. 6, another insert of the tool holder in perspective.

In FIG. 6, another insert 10a is shown. In contrast to insert 10 from FIG. 3, the connection 14a does not have an internal thread, but rather is designed as a borehole, through which the cooling agent can be conducted. The other features of this embodiment of insert 10a are identical to insert 10 and accordingly have the same reference symbols.

In other embodiments which are not separately depicted here, the tool holder 1 can also be designed as a so-called rolling power chuck or as an expanding chuck. Of course, the invention is not restricted to HSK tool holders either. In a corresponding manner, SK, JIS, BT, ABS, capto or other suitable interfaces can also be provided on the receiving body 3.

The invention claimed is:

1. A tool holder for non-positively holding a rotatable tool, the tool holder comprising:
   a receiving body having a receiving opening for a shaft of the rotatable tool and a receiving section for receiving an insert;
   a plurality of slits in the receiving body running in a longitudinal direction of the receiving body and extending radially towards an exterior of the receiving body, each slit of the plurality of slits running from the receiving opening to the receiving section; and
   an insert fixed within the receiving section of the receiving body, the insert including an internal connecting thread for connecting with a connecting part of a supply of an internal cooling agent;
   wherein a radius of the receiving section of the receiving body is larger than a largest radius of the slits.

2. The tool holder according to claim 1, wherein each slit of the plurality of slits opens toward an interior of the receiving body.

3. The tool holder according to claim 1, wherein the receiving opening has a substantially uniform inner diameter.

4. The tool holder according to claim 1, wherein the receiving opening is formed as a stepped borehole having a front inside diameter smaller than a rear inside diameter.

5. The tool holder according to claim 1, wherein each slit of the plurality of slits runs parallel to or at an incline to a rotational axis of the receiving body.

6. The tool holder according to claim 1, wherein the insert is detachably fixed within the receiving section of the receiving body via a thread connection.

7. The tool holder according to claim 1, wherein the insert is fixed within the receiving section of the receiving body via cementing, soldering, or pressing.

8. The tool holder according to claim 1, wherein the insert includes an inner contour having a plurality of indentations distributed around a circumference for engaging with an installing tool.

9. The tool holder according to claim 1, further comprising a sealing web on a front side of the insert, the sealing web sealing the insert to the receiving body.

10. The tool holder according to claim 9, wherein the sealing web is formed by an annular groove on the front side of the insert.

* * * * *